United States Patent [19]

Schneider

[11] 3,710,642
[45] Jan. 16, 1973

[54] SIMPLIFIED SPRING INSTALLATION
[75] Inventor: Adolf Schneider, Altoberndorf, Germany
[73] Assignee: Olympia Werke AG, Wilhelmshaven, Germany
[22] Filed: May 8, 1970
[21] Appl. No.: 35,662

[30] Foreign Application Priority Data

May 8, 1969  Germany.....................P 19 23 424.3

[52] U.S. Cl. .......................74/470, 29/428, 267/179
[51] Int. Cl. ...............................................G05g 1/00
[58] Field of Search ..........29/225, 450, 464; 74/470;
267/179, 182

[56] References Cited

UNITED STATES PATENTS

| 1,017,919 | 2/1912 | Sanders | 267/179 X |
| 2,145,704 | 1/1939 | Wood | 74/470 X |
| 3,113,339 | 12/1963 | Krause | 74/470 X |

FOREIGN PATENTS OR APPLICATIONS

| 212,683 | 2/1957 | Australia | 74/470 |
| 20,192 | /1899 | Switzerland | |

Primary Examiner—William F. O'Dea
Assistant Examiner—Peter D. Ferguson
Attorney—Spencer & Kaye

[57] ABSTRACT

A method and apparatus for guiding a helical spring to proper match-up with a related element while carrying out the sequence of an installation process. The springs are mounted on a bar provided with at least one protrusion having a transition curve for mounting and retaining the spring. The bar is oriented in a direction which is determined by the sequence of the installation process to have the hook or eye of the spring opposite a related element, so that they may be connected. A plurality of bars may be connected in groups to an appropriate member and respective tension springs pre-assembled on them.

3 Claims, 3 Drawing Figures

PATENTED JAN 16 1973

3,710,642

INVENTOR.
Adolf Schneider

BY Spencer & Kaye
ATTORNEYS.

3,710,642

SIMPLIFIED SPRING INSTALLATION

BACKGROUND OF THE INVENTION

The present invention relates to the use of bars for helical springs as an aid for achieving a simplified installation of the springs. In particular, the present invention relates to bars for helical tension springs preassembled on bars arranged in structural groups; which springs have a hook or eye at at least one of their ends.

It is known to use bars for cylindrical helical springs. Such bars are used, for example, for mounting tension springs fastened to an extension of a threaded screw. When the bar is constructed as the extension of a threaded screw, it is provided to facilitate the insertion of the tension spring into an associated receptacle means. In such an arrangement, the bar simultaneously effectively prevents the compressed tension spring from being kinked.

Metal eyes provided with guide bars for fastening strong tension springs are also known in the precision mechanics art. These eyes are pivotally mounted in order to adapt the respective spring axis to a varying direction of the tension on the springs.

If such metal eyes are also to be used for weaker tension springs, difficulties often arise when inserting the eyes provided at the unrestrained end of the spring into the associated receptacle means, because the spring eyes are not at a position in the machine favorable for assembly. In addition, if the assembly is to take place at points in the machine which are of difficult accessibility, it is often necessary to extensively search for the loops and to even tilt the machine in order to find them. The increased demands on the power of concentration of the person performing the installation, therefore, may cause psychological stresses on that person leading to possible damage of the spring loops.

SUMMARY OF THE INVENTION

It is an object of the present invention to provide for installing helical springs, with bars having known fastening means for retaining the springs to cause deflection in the direction of insertion of the springs. The helical springs have a hook or an eye at at least one of their ends. The bars according to the present invention do not require the person installing the springs to locate the hooks or eyes of the springs. These springs have been previously assembled into structural groups for hooking into the respective components in the predetermined area of the machines in question, so that it is only necessary for the person doing the installation to hook each hook or eye into its associated component.

The present invention is based on the fact that the person doing the installation knows from the appropriate instructions setting out the sequence of the installation process, the exact location in the machine at which each hook or eye is located.

This and other objects are accomplished according to the present invention by providing bars on which the helical springs are retained so that they can be stressed by deflection in the direction of their insertion. The directional bars are designed to be able to be brought into a direction determined by the sequence of the assembly process, so that the hooks or eyes at the unrestrained end of the springs and the hooks or eyes on the associated components are always facing one another to facilitate the hook-up. This assures that even after an unsuccessful attempt to hook the unrestrained end of the spring into the associated hook or eye, the end will automatically and rapidly return to its predetermined location in the machine due to the resiliency of the spring.

In order to be able to install helical springs with eyes as well as springs having hooks in an advantageous manner by simply placing them on the bars, a further embodiment of the present invention is characterized in that the bars are provided with at least one hook-type protrusion bearing a transition curve for fastening the springs to be stressed in the direction of their assembly.

DESCRIPTION OF THE PREFERRED EMBODIMENTS

Figure 1:
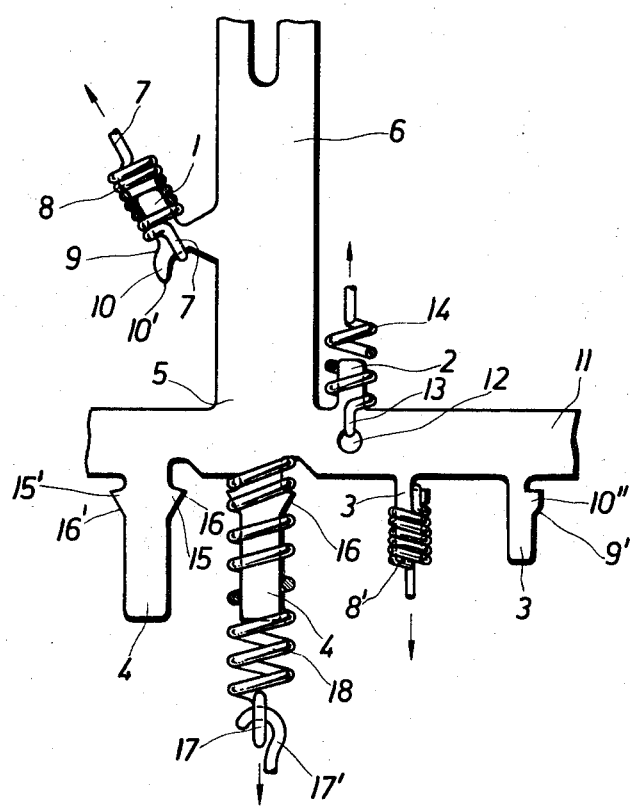
FIG. 1 is a side elevational view showing four different types of bars according to the present invention disposed on one stamped part.
Figure 2:
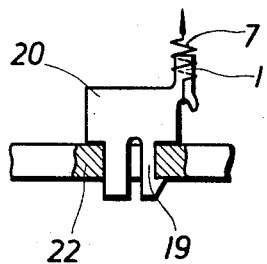
FIG. 2 is a side elevational view, partly schematic and partly in cross section, showing a bar according to the present invention on a stamped part which can be fastened to a portion of a machine by means of a resilient tongue.
Figure 3:
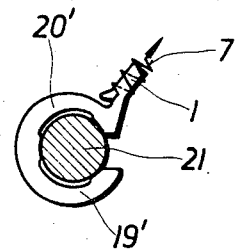
FIG. 3 is an end elevational view, partly schematic and partly in cross section, showing a bar mounted on a stamped part fastened to a shaft.

FIG. 1 shows a stamped part or rigid body segment 5 which may be movably mounted, for example, in a calculator. Part 5 is basically T-shaped, and is provided with four different types of disectional or spring receiving bars 1, 2, 3, and 4.

Directional bar, or spring seat, 1 extends outwardly and upwardly from portion 6 of part 5 at an acute angle thereto, and a helical spring 8 is received and mounted thereon. Spring 8 is provided, for example, with two eyes 7, which may be formed from a length of the spring wire approximately equal to one and one half windings of the spring 8. Bar 1 is provided with a hook portion 10 defining a transition curve 9. When one end region of spring 8 is moved over bar 1, the respective hook 7 is guided by the transition curve 9 around the tip 10' of hook 10. As soon as the respective eye 7 passes around the tip 10' of hook 10, it automatically moves, due to the forces built up in eye 7 and the windings of spring 8 during the passage of the respective eye 7 along the transition curve 9, behind the hook 10 of the bar 1. The spring 8 is now retained on bar 1.

Directional bar 2 extends vertically upward from portion 11 of part 5. It has an associated recess in the form of a bore 12 defined in portion 11 for receiving, for example, an eye 13 of a spring 14. Spring 14 has at least one eye 13, which may be formed of a length of the spring wire equal to approximately three-quarters of a winding of spring 14. Spring 14 is retained on bar 2 by opening the eye 13 and passing the wire forming eye 13 through bore 12 and then closing the eye 13 again.

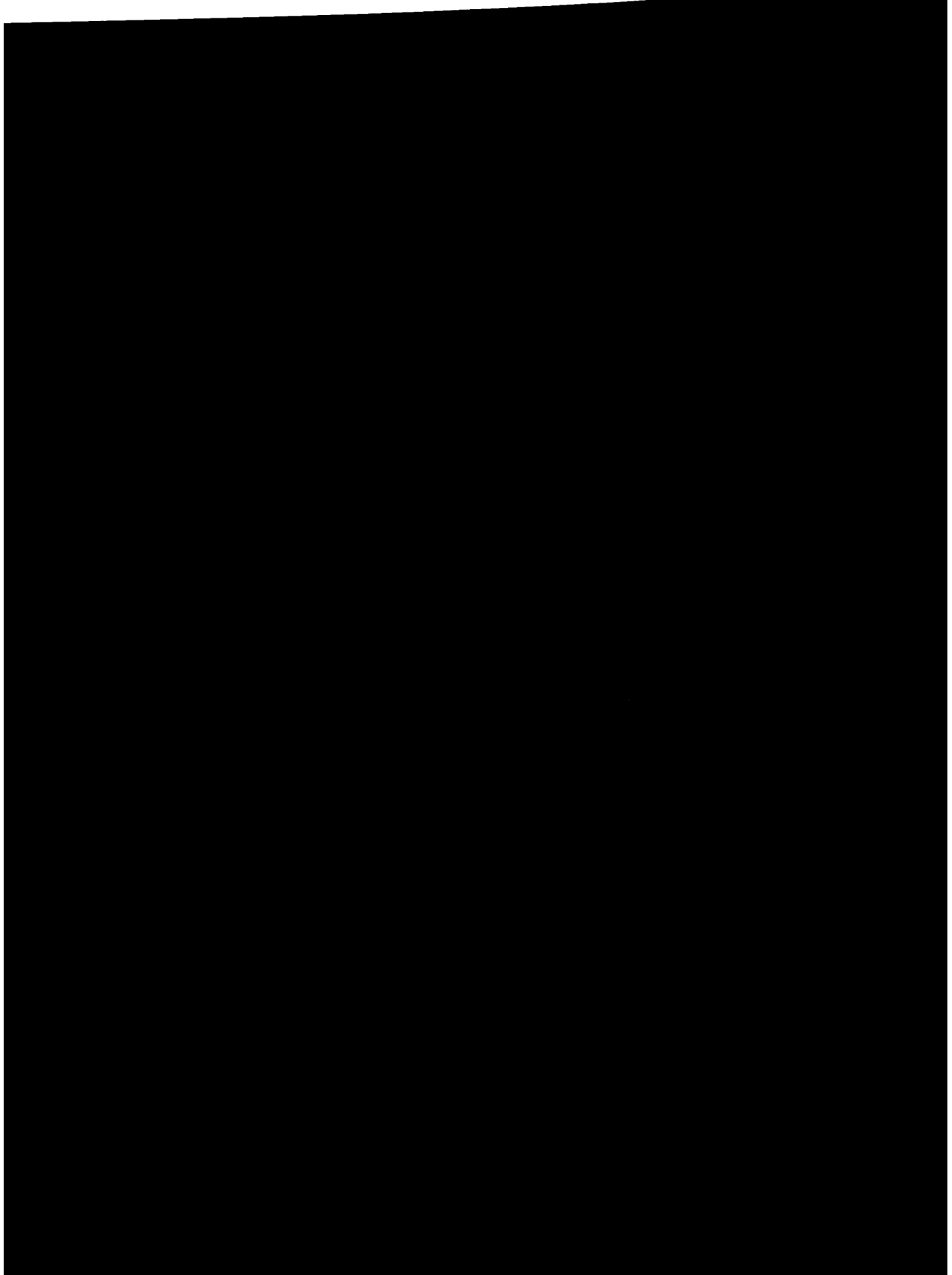

Directional bar 3 extends vertically downwardly from portion 11 of part 5. Bar 3 is shown twice in FIG. 1; once with a spring 8', which is similar to spring 8, on it, and once without any spring on it to show the generally trapezoidal shaped protrusion 10''. Protru-